March 26, 1929. H. K. HUTTON 1,706,449
HEAT CONSERVING FACTORY DUST DISPOSAL SYSTEM
Filed Oct. 22, 1926
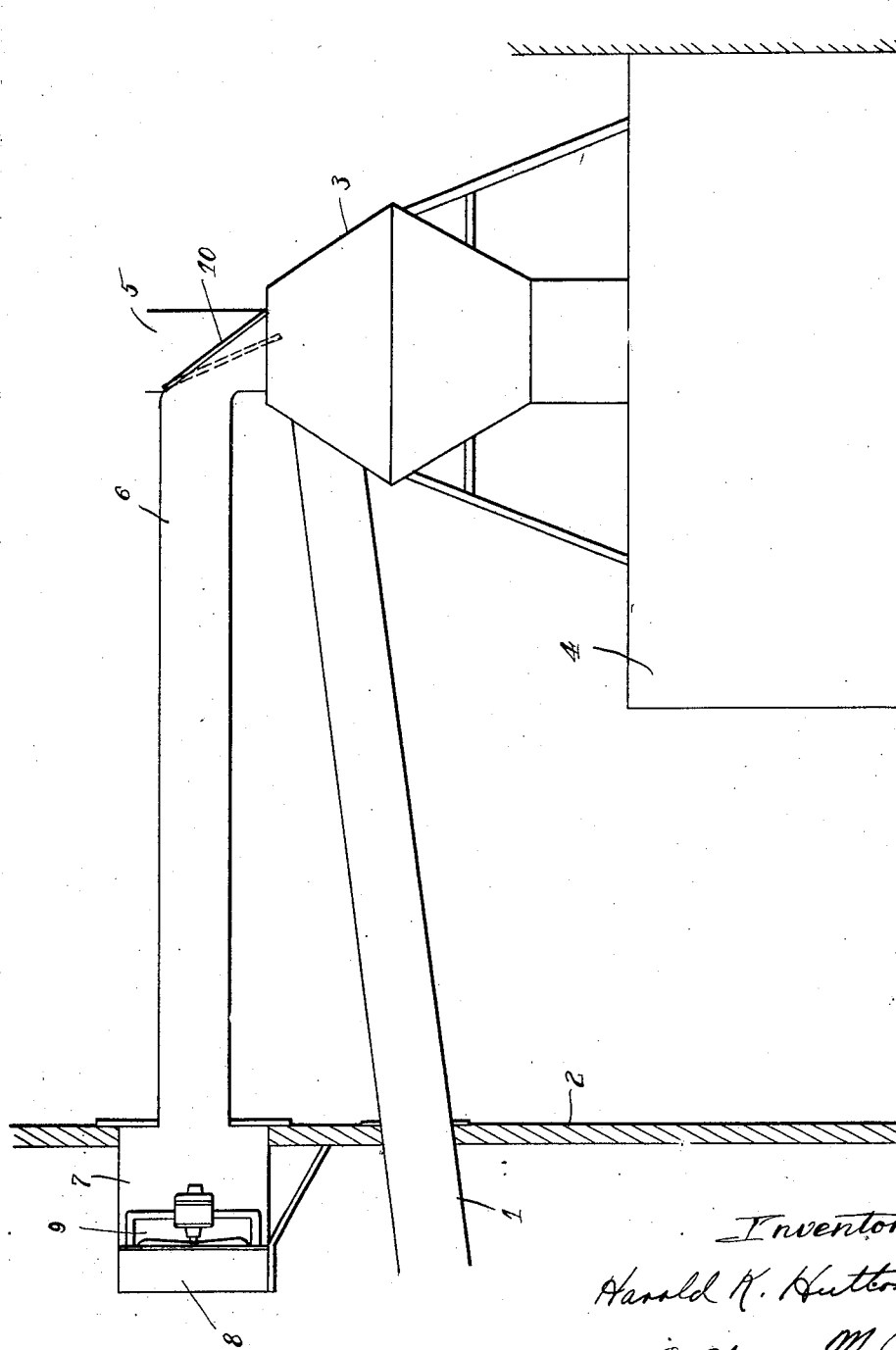

Patented Mar. 26, 1929.

1,706,449

UNITED STATES PATENT OFFICE.

HAROLD K. HUTTON, OF ROCKFORD, ILLINOIS.

HEAT-CONSERVING FACTORY-DUST-DISPOSAL SYSTEM.

Application filed October 22, 1926. Serial No. 143,465.

This invention relates to a system for the disposal of factory dust or refuse so reorganized as to avoid the serious heat losses otherwise occasioned in the operation of such systems.

In systems of this kind used in the past, the dust-laden air exhausted from the machines in the factory was simply conducted to a dust separator or cyclone where the dust or refuse was deposited and the air allowed to pass out to the atmosphere. Obviously, this meant a considerable loss in heating efficiency in cold weather. According to the present invention, I avoid such heat losses by providing a return line from the separator for returning the heated air to the building. In connection with the return line, I also prefer to provide an air filter to insure against the induction of any of the finer particles of dust back into the building and also provide an air outlet at the separator and a regulating valve determining the volume of air allowed to escape to the atmosphere and that allowed to return to the building. The latter provision enables maintaining a desired temperature in the building in warmer weather.

The invention is illustrated in the accompanying drawing showing, diagrammatically, a dust disposal system incorporating my improvements.

As stated above, it has been the practice in the past to provide the exhaust conduits, such as that shown at 1, leading from a building, the wall of which is indicated at 2, to a dust separator or cyclone shown at 3. The separator received dust-laden air from the conduit 1 and deposited the dust and refuse into a bin or pit or other suitable receptacle, shown at 4. The air was allowed to escape directly to the atmosphere. In the present system, an air outlet opening is still provided, as shown at 5, but the air is ordinarily not permitted to escape therethrough but is conducted through a return line or conduit 6 to the building. The conduit extends from the separator 3 at a point between the main body of the separator and the air outlet opening 5 and serves to return the heated air to the building through an inlet connection at 7 in the wall 2. An air filter 8 is preferably provided in the connection 7 to insure against the presence of any fine particles of dust in the returning air. A fan 9 is also provided in the connection 7 to offset the resistance to the flow of air imposed by the filter 8 as well as to further insure the proper draft through the conduit 6. A valve 10 serves when in the full line position indicated to cause the return of all of the heated air to the building through the conduit 6 from the dust separator, but may be adjusted, as indicated by the dotted line position, to permit a certain amount of the heated air to pass out through the opening 5 to the atmosphere. In this way it is obviously possible to maintain any predetermined desired temperature in the building, as, for example, in warmer weather when it is not preferred to retain the heat in the building.

In operation, it will be apparent that the present system effects a considerable saving in heating expenses. The system is particularly intended for use in furniture and wood working factories, where the fine dust particles constitute a considerable health hazard, but is obviously capable of application in numerous other places as, for example, in factories engaged in shoe manufacturing, paint manufacturing and the like. In all of these instances the dust or refuse-laden air is exhausted from the building into the dust separator or cyclone to deposit the dust and refuse into the receptacle 4. The latter, in certain instances, may have conveyor equipment in connection therewith to transport the material deposited therein to the furnace in the building. The heated air is returned to the building and whatever remains in the way of finer dust particles is removed from the air in passing through the filter 8. The air is thus purified as well as humidified. In warmer weather, when it is not important to retain the heat in the building, a certain amount of the heated air may be allowed to escape to the atmosphere, depending on the setting of the valve 10. In this way, any predetermined desired temperature may be maintained.

I claim:

1. In a system of the character described, the combination with an exhaust conduit arranged to lead from a building to conduct dust-laden air therefrom, and a dust separator having said conduit communicating therewith, of an air return conduit communicating with said dust separator and leading back to the building whereby in colder weather to conserve in heating expense by returning heated air to the building after the separation of the dust therefrom, means for filtering the air returned through the air return conduit before it is allowed to enter the building, whereby to remove any remaining fine dust particles which have failed to be separated from the air in the dust separator, and a fan in connection with said filter to offset the resistance to the flow of air imposed thereby and insure the proper indraft through the air return conduit to the building.

2. In a system of the character described, the combination with a building and a dust separator disposed outside the building, of an exhaust conduit leading from the building to the dust separator to conduct dust-laden air thereto, said dust separator having an air exhaust, and an air return conduit communicating with said exhaust and leading back to the building to return heated air to the building after the separation of the dust therefrom.

3. In a system of the character described, the combination with a building and a dust separator disposed outside the building, of an exhaust conduit leading from the building to the dust separator to conduct dust-laden air thereto, said dust separator having an air exhaust, an air return conduit communicating with said exhaust and leading back to the building to return heated air to the building after the separation of the dust therefrom, and a valve for regulating the escape of air through said exhaust whereby in turn to regulate the amount of air returned to the building through the air return conduit.

4. In a system of the character described, the combination with a building and a dust separator of the cyclone type disposed outside the building, of an exhaust conduit leading from the building to the dust separator, the latter being provided with an air exhaust, an air return conduit communicating with said exhaust and leading back to the building to return heated air to the building after the separation of the dust therefrom, and means for filtering the air returned through the air return conduit whereby to remove any remaining fine dust particles which have failed to be separated from the air in the cyclone dust separator.

In witness of the foregoing I affix my signature.

HAROLD K. HUTTON.